(12) United States Patent
Hou et al.

(10) Patent No.: US 7,660,026 B2
(45) Date of Patent: Feb. 9, 2010

(54) METHOD FOR FORMING ELECTRO-OPTIC FILM

(75) Inventors: Wei-Hsin Hou, Taipei (TW); Jau-Min Ding, Taipei (TW); Hsing-Lung Wang, Taoyuan County (TW); Chi-Chang Liao, Tainan (TW); Yan-Rung Lin, Ping-Don County (TW)

(73) Assignee: Industrial Technology Research Institute, Hsinchu (TW)

( * ) Notice: Subject to any disclaimer, the term of this patent is extended or adjusted under 35 U.S.C. 154(b) by 335 days.

(21) Appl. No.: 11/675,090

(22) Filed: Feb. 15, 2007

(65) Prior Publication Data

US 2007/0281144 A1 Dec. 6, 2007

(30) Foreign Application Priority Data

May 30, 2006 (TW) .............................. 95119355 A (51) Int. Cl.
*G02F 1/03* (2006.01)
*G02F 1/33* (2006.01)

(52) U.S. Cl. ...................................... 359/245; 359/315

(58) Field of Classification Search .................. 359/245
See application file for complete search history.

(56) References Cited

U.S. PATENT DOCUMENTS

2004/0003778 A1 * 1/2004 Hayashi ...................... 118/715

* cited by examiner

*Primary Examiner*—Jordan M. Schwartz
*Assistant Examiner*—James C Jones
(74) *Attorney, Agent, or Firm*—Jianq Chyun IP Office (57) ABSTRACT

The invention is directed to a method for forming a flexible electro-optic film. The method comprises steps of providing a first substrate having a conductive layer formed thereon and then forming a first locating structure over the conductive layer, wherein the locating structure includes target regions and periphery regions. The surface tension of the target regions is difference from that of the periphery regions. Thereafter, an electro-optic medium placing process for forming an electro-optic droplet on each of the target regions is performed. A solidifying process for forming a capsule wall covering the electro-optic droplet on each of the target regions is performed. The first substrate is laminated with a second substrate.

26 Claims, 8 Drawing Sheets

METHOD FOR FORMING ELECTRO-OPTIC FILM

CROSS-REFERENCE TO RELATED APPLICATION

This application claims the priority benefit of Taiwan application serial no. 95119355, filed May 30, 2006. All disclosure of the Taiwan application is incorporated herein by reference.

BACKGROUND OF THE INVENTION

1. Field of Invention

The present invention relates to an electronic device and a method for manufacturing the same. More particularly, the present invention relates to a flexible electro-optic film and a method for forming thereof.

2. Description of Related Art

Conventionally, there are several ways which have been proposed for manufacturing a flexible display using roll-to-roll processes. Among currently developed technology for manufacturing the flexible display, the polymer dispersed liquid crystal display (PDLC) process, the polymer stabilized liquid crystal display (PSLC) process, the microcapsule approach and the microcup approach are widely applied in the industry.

As for the PDLC process and the PSLC process, the distribution of polymer phase and the liquid crystal phase cannot be efficiently controlled so that the display formed by using the PDLC process or the PSLC process has the drawbacks such as low contrast ratio and high driving voltages.

As for the microcapsule approach, it is hard to generate a uniform capsule spheres so that the driving voltage of the display formed by using the microcapsule approach is relatively high. It is also difficult to produce a color display by using this approach.

As for the microcup approach, a dielectric layer is located on the bottom of each cell while the display is formed by using this approach so that additional potential drop generates and the driving voltage of the display is relatively high.

None of the PDLC process, the PSLC process, the microcapsule approach and the microcup approach possesses the surface alignment ability so that only a few type of liquid crystal can be applied. In addition, none of the PDLC process, the PSLC process, the microcapsule approach and the microcup approach can create a direct contact of electro-optic media with conductive electrode. Therefore, the displays formed by using the approaches mentioned above are the potential driven devices.

SUMMARY OF THE INVENTION

Accordingly, the present invention provides a method for forming a flexible electro-optic film having uniform electro-optic cell size.

The present invention further provides a method for forming a flexible electro-optic film capable of improving surface alignment directly.

As embodied and broadly described herein, the invention provides a method for forming a flexible electro-optic film. The method comprises steps of providing a first substrate, wherein a first conductive layer is disposed on the first substrate and then forming a first locating structure over the first conductive layer, wherein the first locating structure comprises a plurality of first target regions and a plurality of first peripheral regions around the first target regions, and the surface tension of the first target regions is different from that of the first peripheral regions. An electro-optic medium placing process for forming a first electro-optic droplet on each of the first locations is performed. A solidifying process for forming a capsule wall covering the first electro-optic droplet on each of the first locations is performed. The first substrate is laminated with a second substrate having a second conductive layer formed thereon.

The present invention further provides a flexible electro-optic film. The flexible electro-optic film comprises a first substrate, a first locating structure, a plurality of electro-optic droplets and a second substrate. The first substrate has a conductive layer formed thereon and the first locating structure is disposed on the conductive layer, wherein the first locating structure comprises a plurality of first target regions and a plurality of first peripheral regions around the first target regions. The first electro-optic droplets are disposed on the first locations respectively, and each of the electro-optic droplets has a first capsule wall formed thereon. The second substrate disposed over the first substrate.

In the present invention, since the locating structure possesses two different surface properties, it is easy to dispose the electro-optic droplets on the target regions of the locating structure respectively. That is, by using the difference of the surface tension between the electro-optic media, the locating structure, the conductive layer, the interval pattern layer or by using the wall pattern layer, the electro-optic media can accurately aggregate on the target regions of the locating structure respectively. Moreover, the locating structure can have surface alignment purpose so that the liquid crystal droplets can successfully aligned when the locating structure with the surface alignment purpose is directly in contact with the liquid crystal droplets. Therefore, the manufacturing cost of the flexible electro-optic film is decreased. Furthermore, by using the capsule wall to separate the multi-layered electro-optic media from each other, the customized displaying color can be obtained and the display brightness of the flexible electro-optic film is increased. In addition, since the electro-optic media is directly in contact with the conductive electrode, the electro-optic media can be the potential driven electro-optic media or the current driven electro-optic media.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A' is a cross-sectional view showing a locating structure according to the other embodiment of the present invention.

DESCRIPTION OF THE PREFERRED EMBODIMENTS

Figure 1A:
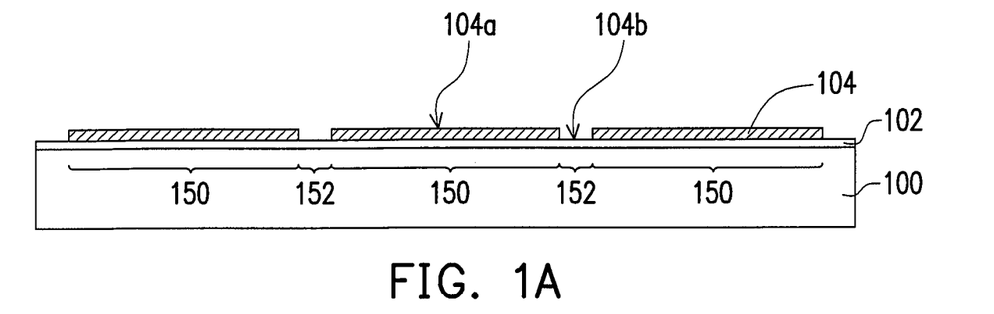
FIGS. 1A through 1G are cross-sectional views schematically illustrating a method for forming a flexible electro-optic film according to an embodiment of the invention.

FIGS. 1A through 1G are cross-sectional views schematically illustrating a method for forming a flexible electro-optic film according to an embodiment of the invention. As shown in FIG. 1A, a substrate 100 is provided. Then, a conductive layer 102 is formed on the substrate 100. The conductive layer 102 can, for example, have a plain conductive layer or a patterned conductive layer. The substrate 100 can be a flexible or bendable or rigid substrate. The substrate 100 can also be, for example, made of plastic, metal, glass or other composite materials. The conductive layer 102 can be, for example but not limited to, made of transparent conductive materials such as ITO, ATO or others. Alternatively, the conductive layer 102 can be, for example, made of metallic materials such as Al, Cu, Ag, Mo, Cr, etc. Furthermore, the conductive layer 102 can be, for example, made of conductive polymers or conductive composite materials such as conductive inks.

Thereafter, locating structure 104 is formed on the conductive layer 102. The locating structure 104 comprises several target regions 150, which are predetermined for forming electro-optic droplets, and several peripheral regions 152 around the target regions 150. It should be noticed that the surface tension of the target regions 150 is different from that of the peripheral regions 152 and the shapes and sizes of the target regions can be varied according to the actual needs. In the present embodiment, the locating structure 104 can be, for example, composed of material layers 104a and spaces 104b. The material layers 104a are formed within the target regions 150 respectively. The spacers 104b disposed between the material layers 104a expose the conductive layer 102 and correspond to the peripheral regions 152 respectively. The surface tension of the material of the material layers 104a is different from the surface tension of the top surface of the conductive layer 102. The method for forming the locating structure 104 on the conductive layer 102 can be, for example, a printing process, a coating process, a transferring process or a photolithography processes.

Figure 1B:
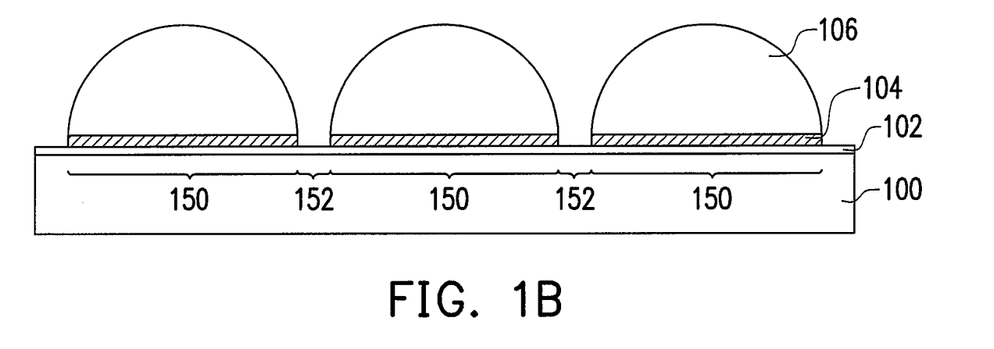

As shown in FIG. 1B, an electro-optic medium placing process is performed to form an electro-optic droplet 106 in each of the target region 150 of the locating structure 104. The electro-optic medium placing process can be, for example, an inject printing, an injection or any other feasible processes.

The electro-optic droplet 106 can be, for example but not limited to, made of liquid crystal, electrowetting fluid, electrophoretic media, electrochromic fluid or other feasible electro-optic materials. Moreover, the electro-optic droplets 106 can be the droplets with different colors. For example, the electro-optic droplets 106 can be made of cholesteric liquid crystal which can reflect lights with different wavelength, guest-host liquid crystal added with different dyes or the electrophoretic media with different colors. In addition, the electro-optic droplets 106 can be, for example, made of certain types of monomers or oligomers. Furthermore, the electro-optic droplet 106 can be, for example, disposed at specific locations to show both transmissive character and reflective character and to serve as a transflective display applications.

As the description mentioned above, the surface property of the material of the material layers 104b is different from the surface property of the conductive layer 102 so that the electro-optic droplets are easily aggregating at each of the target regions 150 of the locating structure 104. On the other words, the surface tension of the surface of each target region 150 of the locating structure 104 where the electro-optic droplets aggregate is different from the surface tension of the surface of the peripheral regions 152 with no electro-optic droplets formed thereon. Preferably, the surface tension of the locating structure 104 is smaller than that of the electro-optic droplets 106. It should be noticed that, in practice, when it is necessary for the electro-optic droplets to be assisted with a surface alignment material for crystal aligning, the material of the material layers 104a not only has the surface property different from that of the conductive layer 102 but also has the characteristic for the surface alignment. Therefore, when the locating structure 104 should further have the surface alignment characteristic, the method for forming the aforementioned locating structure 104 further comprises a step of performing an alignment process including a rubbing alignment process, an ion beam alignment process, a photo alignment process or other proper process on the locating structure 104 so that the surface of the locating structure 104 has the alignment characteristic.

Figure 1C:
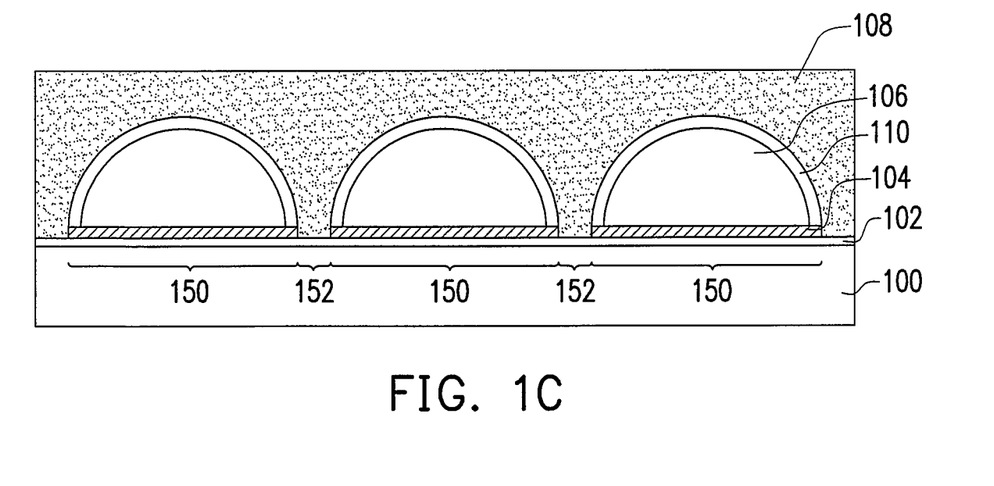

As shown in FIG. 1C, a reactive solution 108 is formed to contact with the substrate 100 and the electro-optic droplets 106. The method for forming the reactive solution 108 can be, for example, a coating process, submerging process or any other method that allow the reactive solution 108 to directly contact with the electro-optic droplets 106. The reactive solution 108 comprises certain types of monomers or oligomers which can form an interfacial polymerization with the monomers or oligomers within the electro-optic droplets 106.

Then, a solidifying process is performed to form capsule walls 110 to cover the electro-optic droplets 106 respectively. The thickness of the capsule wall 110 depends on the practical requirements. The interfacial polymerization can be, for example, initiated by a thermal process, a photo or any other methods or processes.

Figure 1D:
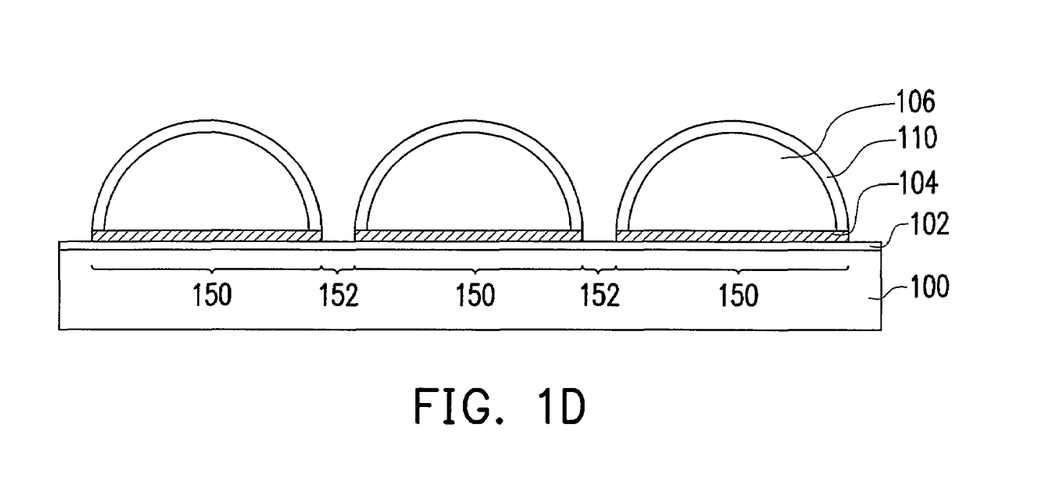

As shown in FIG. 1D, after the capsule wall 110 is formed, the reactive solution 108 can be removed by sucking, adsorbing, decanting or vacuuming away from the substrate 100. After removing the reactive solution 108, a film covering electro-optic droplets 106 on the locating structure 104 is obtained.

Figure 1E:
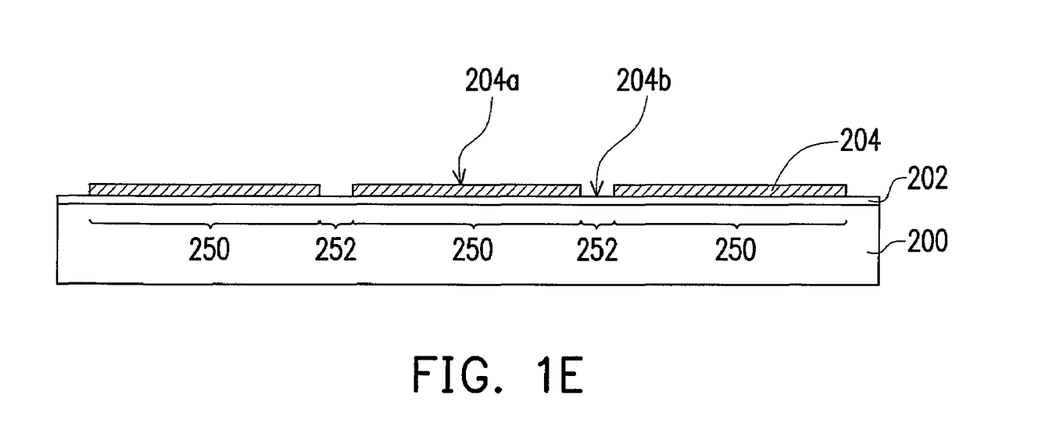

As shown in FIG. 1E, a substrate 200 having a conductive layer 202 and a locating structure 204 formed thereon is provided. The conductive layer 202 can, for example, have a plain conductive layer or patterned conductive layer. The substrate 200 can be, for example, made of flexible or bendable or rigid materials. Alternatively, the substrate 200 can be, for example, made of plastic, metal, glass or other composite materials. Moreover, the conductive layer 202 can be, for example, made of transparent conductive materials such as ITO, ATO or others. The conductive layer 202 can be, for example, made of metallic materials such as Al, Cu, Ag, Mo and Cr. Furthermore, the conductive layer 202 can be, for example, made of conductive polymers or conductive composite materials such as conductive inks.

The locating structure 204 can comprise several target regions 250 and peripheral regions 252, wherein the surface tension of the target regions 250 is different from that of the peripheral regions 252 and the shapes and sizes of the target regions 250 can be varied according to the practical requirements. Similar to the locating structure 104, in this embodiment, the locating structure can be, for example, composed of material layers 204a and spaces 204b between the material layers 204a. The material layers 204a are formed in the target regions 250 respectively. The spaces 204b between the material layers 204a expose conductive layer 202 and corresponds to the peripheral regions 252. The surface property of the material layers 204a is different from the surface property of the top surface of the conductive layer 202. The method for forming the material layers 204a includes a printing process, a coating process, a transferring process or a photolithography process. In practical application, according to the surface alignment property of the electro-optic media, the material of the material layers 204a can be possesses the surface alignment property. In addition, the target regions 250 of the locating structure 204 can, for example, have a surface tension smaller than that of the electro-optic droplets 106. Moreover, the method for forming the locating structure 204 having the surface alignment purpose is as same as the method for forming the locating structure 104 having the surface alignment purpose and is not detail described herein.

Figure 1F:
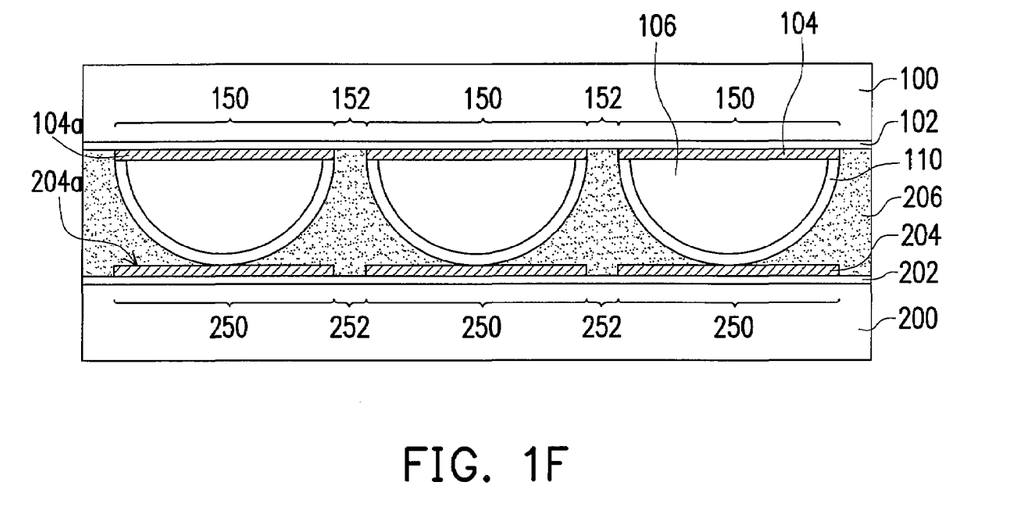

As shown in FIG. 1F, a polymer layer 206 is formed over the substrate 200. The polymer layer 206 can have different viscosity depending on practical requirements. The substrate 100 is laminated with the substrate 200, wherein the electro-optic droplets 106 are in contact with the target regions 204a respectively through the capsule wall 110. Furthermore, the substrate 100 is attached to the substrate 200 through the polymer layer 206. Moreover, a spacer may be used during the lamination process in order to obtain a uniform gap width between the substrate 100 and the substrate 200.

Figure 1G:
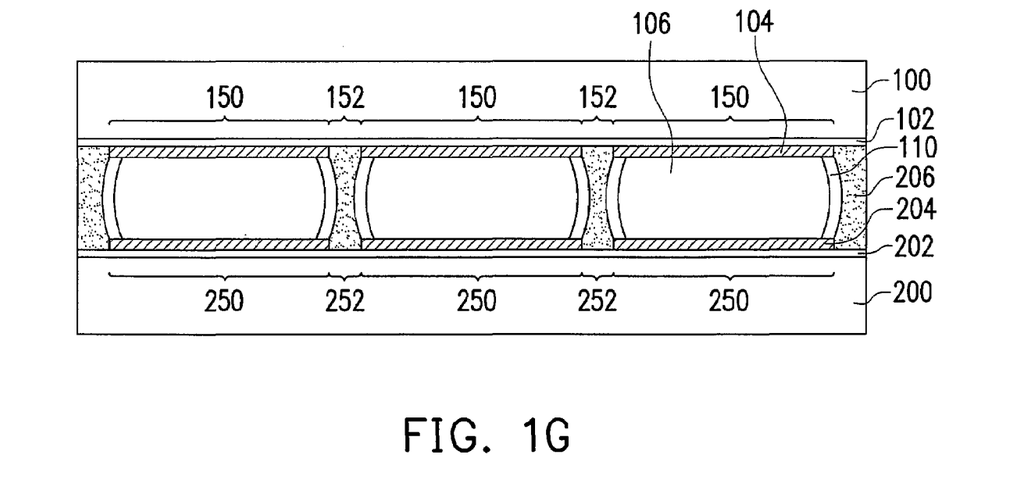

Alternatively, as shown in FIG. 1G, after the substrate 100 is laminated with the substrate 200, the liquid droplets 106 can, for example, directly in contact with both of the locating structure 204 and the locating structure 104 or both of the conductive layer 104 and the conductive layer 204 by changing the surface property of the electro-optic droplets 106 or the locating structure 204 using heat, photo or other method.

After the substrate 100 is laminated with the substrate 200 to be an electro-optic film, the whole film is subjected to UV or thermo or any other methods or processes to solidify the polymer to secure the electro-optic droplets 106.

Furthermore, in the embodiment mentioned above, the locating structure is represented by the locating structure 104 and the locating structure 204 formed over the substrate 200 is similar to the locating structure 104 over the substrate 100. However, the locating structures on the substrate 100 and the substrate 200 are not limited to the aforementioned description.

Figure 2A:
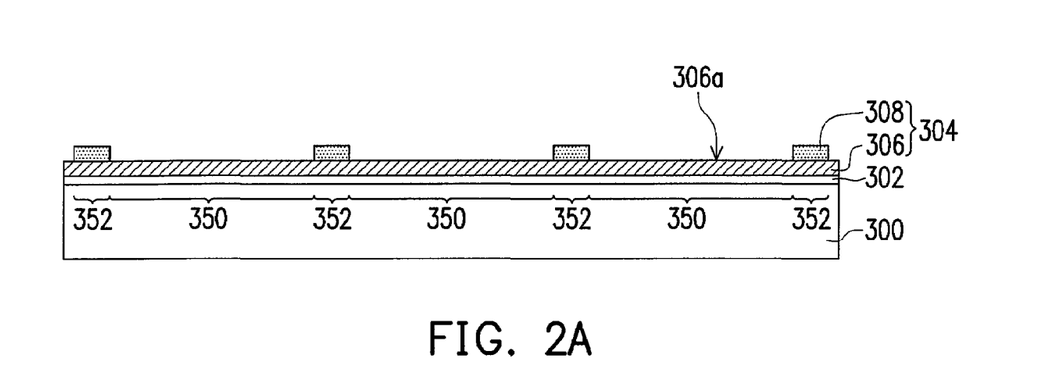
FIGS. 2A through 2B are cross-sectional views showing a method for forming a locating structure with electro-optic droplets thereon according to another embodiment of the present invention.
Figure 2B:
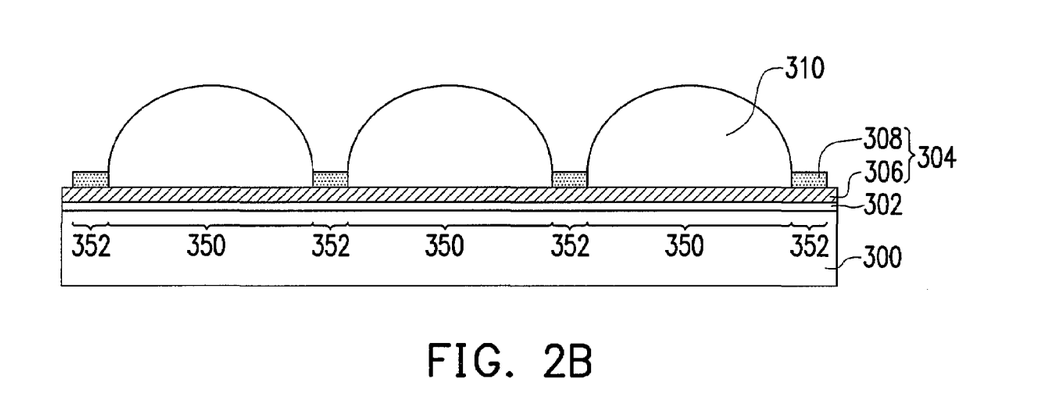
Figure 2C:
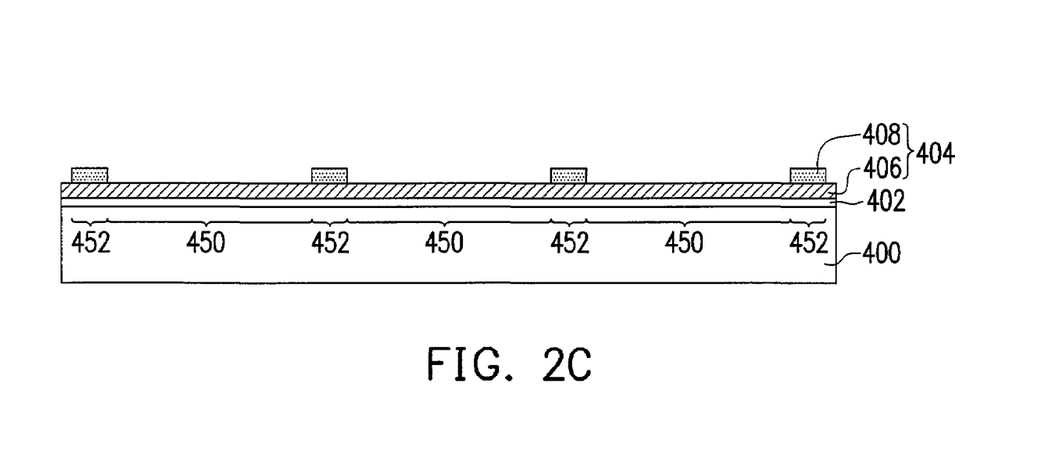
FIG. 2C is a cross-sectional view showing a method for forming a second substrate having a locating structure thereon according the embodiment shown in FIGS. 2A through 2B of the present invention.

FIGS. 2A through 2B are cross-sectional views showing a method for forming a locating structure with electro-optic droplets thereon according to another embodiment of the present invention. FIG. 2C is a cross-sectional view showing a method for forming a second substrate having a location thereon according the embodiment shown in FIG. 2A of the present invention.

As shown in FIG. 2A, a conductive layer 302 is formed on the first substrate 300. The conductive layer 302 can, for example, have a plain conductive layer or a patterned conductive layer. The first substrate 300 can be, for example, made of flexible or bendable or rigid materials. Furthermore, the first substrate 300 can be, for example, made of plastic, metal, glass or other composite materials. The conductive layer 302 can be, for example, made of transparent conductive materials such as ITO, ATO or others. Furthermore, the conductive layer 302 can be, for example, made of metallic materials such as Al, Cu, Ag, Mo and Cr. Additionally, the conductive layer 302 can be, for example, made of conductive polymers or conductive composite materials such as conductive inks.

A locating structure 304 is formed over the first substrate 300. The locating structure 304 comprises several target regions 350, which are predetermined for forming electro-optic droplets, and several peripheral regions 352 around the target regions 350. The surface tension of the target regions 350 is different from that of the peripheral regions 352 and the shapes and the sizes of the target regions 350 can be varied according to the practical requirements. In this embodiment, the locating structure 304 can be, for example, composed of material layer 306 and interval pattern layer 308. The material layer 306 is formed on the conductive layer 302 in both of the target regions 350 and the peripheral regions 352. The interval pattern layer 308 is formed on a portion of the material layer 306 in the peripheral regions 352. The surface tension of the material layer 306 is different from that of the interval pattern layer 308. The method for forming the location structure 304 comprises steps of entirely forming a material layer 306 over the first substrate 300 and then forming an interval pattern layer 308 on the material layer 306 in the peripheral regions 352. In the practical application, when it is necessary for the later formed electro-optic droplets on the locating structure 304 to be used with the material layer with the surface alignment purpose, the material layer 306 can also be the material possessing the surface alignment ability. When the material layer 306 is made of the material with the surface alignment purpose, the method for forming the material layer 306 further comprises a step of performing an alignment process such as a rubbing alignment process, an ion beam alignment process, a photo alignment process or other proper process on the material layer 306 so that the surface of the material layer 306 has the alignment property. Another locating structure 304 is composed of the interval pattern layer 308. The interval pattern layer 308 is formed in the peripheral region 352 and the target regions 350 between the interval pattern layer 308 are expose the conductive layer 302. The method for forming the locating structure 304 comprises the step of forming an interval pattern layer 308 directly on a portion of the first substrate 300 in the peripheral region 352 without forming the material layer 306 beforehand. The size and shape of the interval pattern layer 308 can be varied according to the practical needs. The method for forming the interval pattern layer 308 can be, for example, a printing process, a coating process, a transferring process, a photolithography process or any other available methods or processes. Also, the height of the interval pattern layer 308 is about 0.01~100 μm.

As shown in FIG. 2B, electro-optic droplets 310 are formed on the material layer 306 of the target regions 350 respectively. The method for forming the electro-optic droplets 310 can be, for example, an inject printing, an injection or any other available methods or processes. The material of the electro-optic droplets 310 is as same as that of electro-optic droplets mentioned in the previous embodiment and is not detail described herein. Since the surface tension of the interval pattern layer 308 is different from that of the material layer 306, the electro-optic droplets are easily aggregating on the material layer 306 of the target regions 350. The interval pattern layer 308 can be, for example, made of the material having a surface tension smaller than that of the electro-optic droplet 310. In addition, the method for forming the capsule wall to cover the electro-optic droplets by using the interfacial polymerization is as same as the method mentioned in the previous embodiment and is not detail described herein.

As shown in FIG. 2C, for laminating with the first substrate 300 shown in FIG. 2B, a second substrate 400 having a conductive layer 402 formed thereon is provided. Locating structure 404 comprises several target regions 450 and peripheral regions 452, wherein the surface tension of the target regions 450 is different from that of the peripheral regions 452. In this embodiment, the method for forming the locating structure 404 comprises steps of forming a material layer 406 on the conductive layer 402 in the target regions 450 and the peripheral region 452 and then forming an interval pattern layer 408 on the material layer 406 of the peripheral regions 452. The materials of the conductive layer 402, the material layer 406 and the interval pattern layer 408 are as same as the materials of the conductive layer 302, the material layer 306 and the interval pattern layer 308 described above respectively and are not detail described herein. In this embodiment, the first substrate having the locating structure and the electro-optic droplets and be directly laminated with the second substrate with the conductive layer.

In this embodiment, by using the surface tension difference between the target regions and the peripheral regions of the locating structure, the electro-droplets can be accurately formed on the target regions of the locating structure respectively. Hence, it is easy for aligning the locations on two substrates to each other. In addition, since the material layer has surface alignment purpose and is directly in contact with the electro-optic droplets, the crystal-type electro-optic media can be successfully aligned.

Figure 3A:
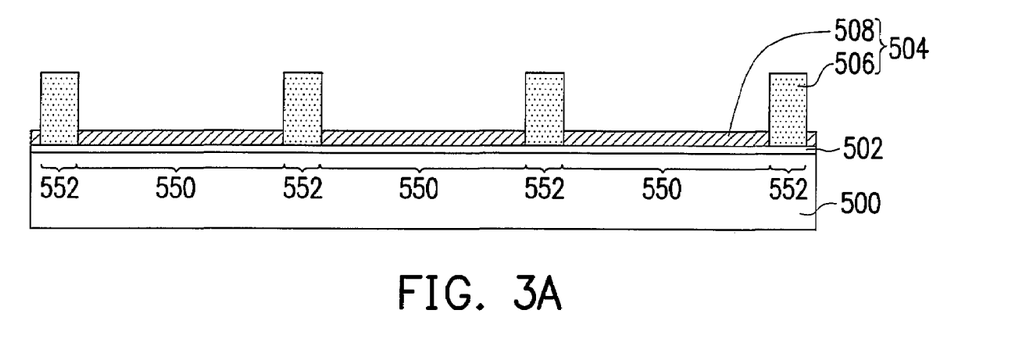
FIGS. 3A through 3B are cross-sectional views showing a method for forming a locating structure with electro-optic droplets thereon according to the other embodiment of the present invention.
Figure 3B:
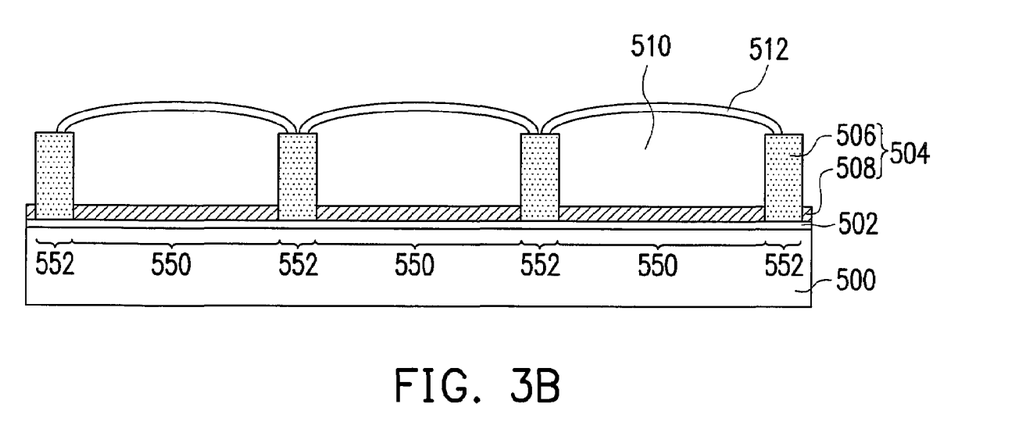

FIGS. 3A through 3B are cross-sectional views showing a method for forming a location structure with electro-optic droplets thereon according to the other embodiment of the present invention. As shown in FIG. 3A, a first substrate 500 having a conductive layer 502 formed thereon is provided. A locating structure 504 is formed on the conductive layer 502. The locating structure 504 comprises several target regions 550, which are predetermined for forming electro-optic droplets, and several peripheral regions 552 around the target regions 550. The surface tension of the target regions 550 is different from that of the peripheral regions 552 and the sizes and shapes of the target regions 550 can be varied with the practical requirement. In this embodiment, the locating structure 504 can be, for example, composed of material layer 508 and wall pattern layer 506. The wall pattern layer 506 is formed on the conductive layer 502 in the peripheral regions 552. The material layer 508 is formed on the conductive layer 502 in the target regions 550. The surface tension of the material layer 508 is different from that of the wall pattern layer 506. The method for forming the location structure 504 comprises steps of forming a wall pattern layer 506 on the conductive layer 502 of the peripheral regions 552 and forming a material layer 508 on the conductive layer 502 of the target regions 550. The material layer 508 can be, for example, made of the material for a surface alignment purpose. Alternatively, in one embodiment, as shown in FIG. 3A', the material layer 508a not only covers the conductive layer 502 of the target regions 550 but also covers the wall patterned layer 506 of the peripheral regions 552. That is, the material layer 508a covers the entire first substrate 500.

The conductive layer 502 can, for example, have a plain conductive layer or a patterned conductive layer. The conductive layer 502 can be, for example, made of transparent conductive materials such as ITO, ATO or others. Furthermore, the conductive layer 502 can also be, for example, made of metallic materials such as Al, Cu, Ag, Mo and Cr. Moreover, the conductive layer 502 can be, for example, made of conductive polymers or conductive composite materials such as conductive inks.

The method for forming the wall pattern layer 506 comprises a printing process, a molding process, a coating process, a transferring process, a photolithography process or any other available methods or processes. When the material layer 508 is made of a material for the alignment purpose, the method for forming the material layer 508 further comprises a step of performing an alignment process including a rubbing alignment process, an ion beam alignment process, a photo alignment process or other proper process on the material layer 508 so that the surface of the material layer has the alignment property.

As shown in FIG. 3B, electro-optic droplets 510 are formed at the locations 506a respectively. It should be noticed that the electro-optic droplet 510 is enclosed by the wall pattern layer 506. The method for forming the electro-optic droplet 510 can be, for example, an inject printing, an injection or any other available methods or processes. The electro-optic droplet 510 can be liquid crystal fluid, electrowetting fluid, electrophoretic fluid, electrochromic fluid or other feasible electro-optic materials. The material of the electro-optic droplets 510 is as same as electro-optic droplets mentioned in the previous embodiment and is not detail described herein. The surface tension of the surface of each target region 550 where the electro-optic droplets aggregate is different from that of the peripheral regions 552 where the electro-optic droplets do not aggregate. That is, the surface tension of the wall pattern layer 506 is different from that of the exposed material layer 508. Therefore, it is easy for the electro-optic droplets aggregate on the material layer 508 of the target regions 550. In addition, the method for forming the capsule wall 512 to cover the electro-optic droplets by using the interfacial polymerization is as same as the method mentioned in the previous embodiment and is not detail described herein.

As shown in FIG. 3B, the electro-optic droplet 510 is located on the target regions 550 between the wall pattern layer 506. The electro-optic droplets 510 on the target regions 550 respectively can have colors different from each other or can be made of the electro-optic media different from each other. The material of the electro-optic droplets 510 is described in the previous embodiment and is not described herein.

In the previous embodiments, the first substrate having the locating structure and electro-optic droplets formed thereon is laminated with the second substrate only having the locating structure formed thereon or directly laminated with the second substrate having the conductive layer formed thereon. However, the present invention is not limited to the descriptions mentioned above.

Figure 4A:
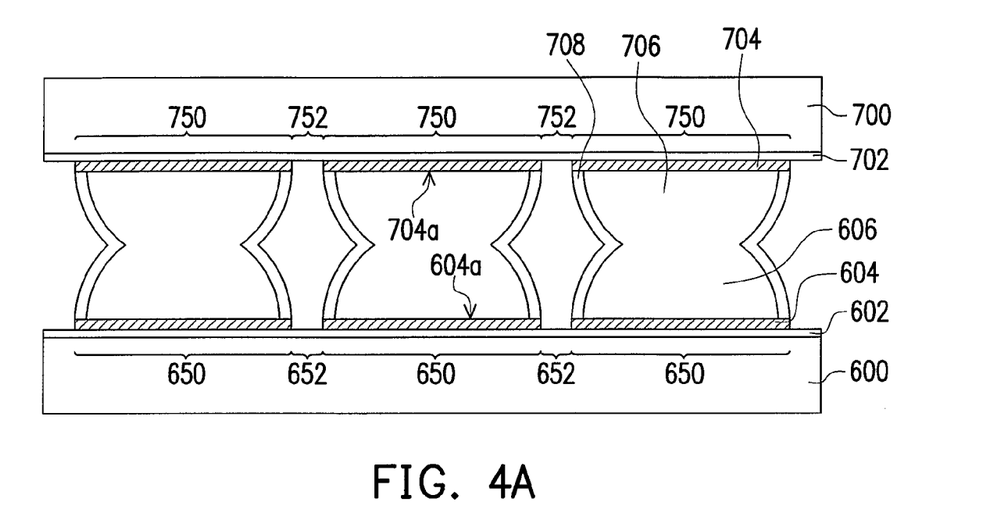
FIG. 4A is a cross-sectional view showing a flexible electro-optic film according to one embodiment of the present invention.
Figure 4B:
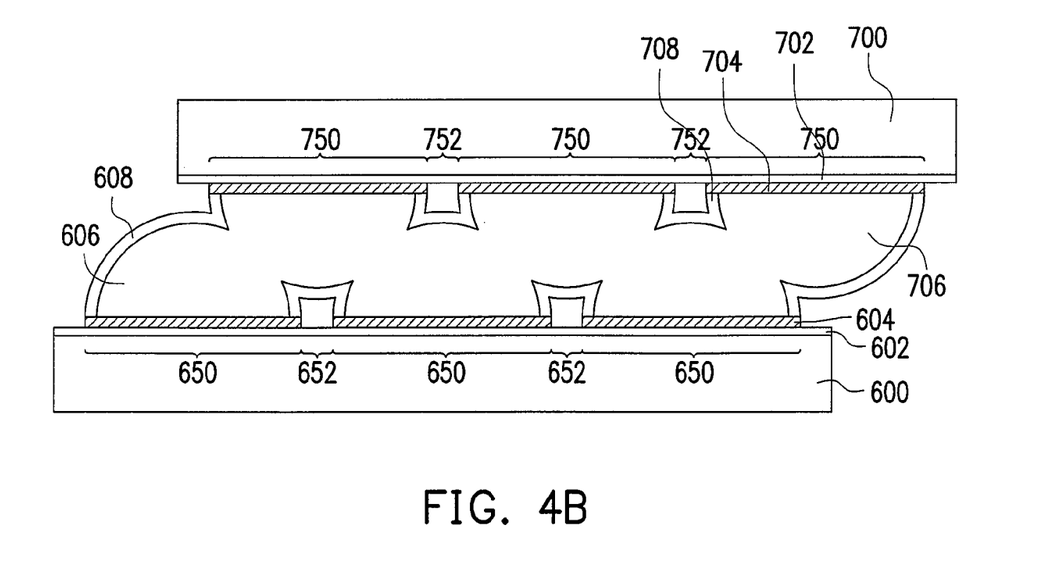
FIG. 4B is a cross-sectional view showing a flexible electro-optic film according to another embodiment of the present invention.

FIG. 4A is a cross-sectional view showing a flexible electro-optic film according to one embodiment of the present invention. FIG. 4B is a cross-sectional view showing a flexible electro-optic film according to another embodiment of the present invention. As shown in FIG. 4A together with FIG. 4B, a first substrate 600 and a second substrate 700 have locating structures 604 and 704 and each of the locating structures 604 and 704 comprise target regions 650/750 and peripheral regions 652/752. The target regions 650 and 750 have electro-optic droplets 606 and 706 formed therein respectively. Polymer layers are formed over the first substrate 600 and the second substrate 700 respectively and then the first substrate 600 is laminated with the second substrate 700. The contact portion between the capsule walls 608 and 708 breaks and the electro-optic droplets 606 and 706 are mutual merging with each other.

In the aforementioned embodiment, by using the different surface tension between the target regions and the peripheral regions of the locating structure, the electro-optic droplets is easily aggregating on the specific locations. That is, the surface tension of the target regions where the electro-optic droplets aggregate is different from that of the peripheral regions where the electro-optic droplets do not aggregate. On the other words, the electro-optic droplets can be accurately formed on the target regions of the locating structure respectively. Therefore, it is easy to align the target regions on two substrate to each other. Furthermore, the electro-optic media can be the potential driven electro-optic media or the current driven electro-optic media. In addition, the capsule wall can separate different electro-optic media from each other so that the separated electro-optic media can have different colors or can be made of different materials. Further, since the surface of the target regions of the locating structure on the substrate can have the surface alignment purpose and is directly in contact with the electro-optic droplets, the crystal-type electro-optic media can be successfully aligned. Also, the manufacturing process according to the present invention can be applied to the roll-to-roll process with low cost and high yield advantages.

In the aforementioned embodiment, only one-layer electro-optic media structure is disposed between two substrates. However, the present invention is not limited to the single-layer electro-optic media structure.

Figure 5:
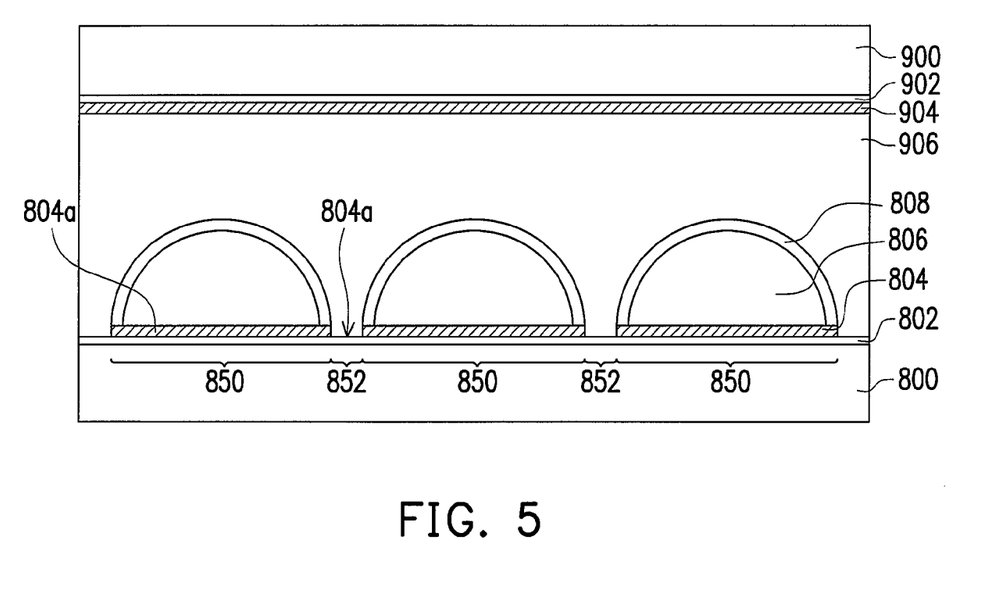
FIG. 5 is a cross-sectional view showing a flexible electro-optic film having a dual-electro-optic media structure according to one embodiment of the present invention.

In the practical application, there can be a dual-electro-optic media structure between two substrates. FIG. 5 is a cross-sectional view showing a flexible electro-optic film having a dual-electro-optic media structure according to one embodiment of the present invention. As shown in FIG. 5, as described above, a first substrate 800 is provided. The first substrate 800 has a conductive layer 802 formed thereon and a locating structure 804 formed on the conductive layer 802. The locating structure 804 can be, for example, composed of material layers 804a and spaces 804b between the material layers 804a. The material layers 804 are disposed in the target regions 850 respectively. The spaces 804b between the material layers 804a expose the conductive layer 802 and correspond to the peripheral regions 852 respectively. As described above, electro-optic droplets 806 are formed on the target regions 850 of the locating structure 804 respectively. Then, a second substrate 900 is provided. An electro-optic media layer 906 is directly coated over the second substrate 900. Then, the first substrate 800 is laminated with the second substrate 900. According to the practical requirements, a material layer with the surface alignment purpose can be formed between the second substrate 900 and the electro-optic media layer 906 so that the electro-optic media layer 906 over the second substrate 900 can be successfully aligned. Furthermore, between the second substrate 900 and the material layer 904, it further comprises a conductive layer 902. It should be noticed that the capsule wall 808 covering the electro-optic droplets 806 separates the electro-optic droplets 806 from the electro-optic media layer 906. Therefore, the electro-optic droplets 806 and the electro-optic media layer 906 can be made of different electro-optic material or can have different colors. For example, the electro-optic droplets 806 and the electro-optic media layer 906 can be made of cholesteric liquid crystal which can reflect lights with different wavelength, guest-host liquid crystal added with different dyes or the electrophoretic media with different colors. According to the practical needs, the dual-electro-optic media structure can be designed to display the customized color. Alternatively, one electro-optic media layer of the dual-electro-optic media structure can be made of levo-cholesteric liquid crystal and the other electro-optic media layer of the dual-electro-optic media structure can be made of dex-cholestoric liquid crystal so that the brightness of the dual-electro-optic media structure can be increased. In addition, the materials of the electro-optic droplets 806 and the electro-optic media layer 906 are as same as that of electro-optic droplets mentioned in the previous embodiment and are not detail described herein. The first substrate 800 of this embodiment is based on the structure of the substrate 100 shown in FIG. 1D. However, in the practical application, the first substrate is not limited to the structure mentioned above and can be the first substrate 300 mentioned in the previous embodiment (as shown in FIG. 2B), the first substrate 500 shown in FIG. 3B.

Figure 6A:
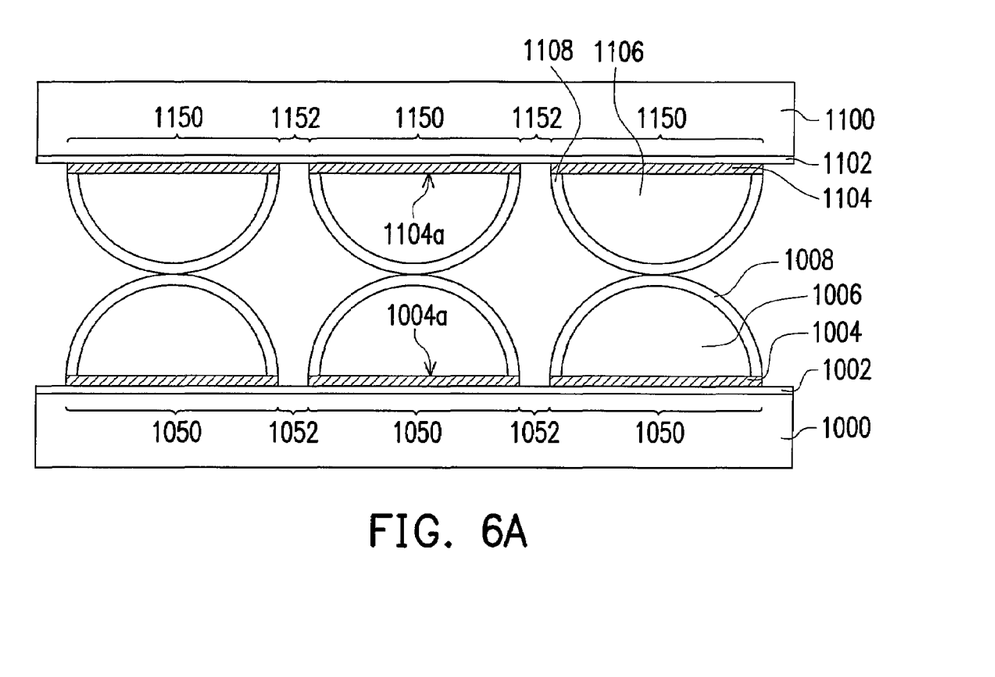
FIG. 6A is a cross-sectional view showing a flexible electro-optic film having a dual-electro-optic media structure according to another embodiment of the present invention.
Figure 6B:
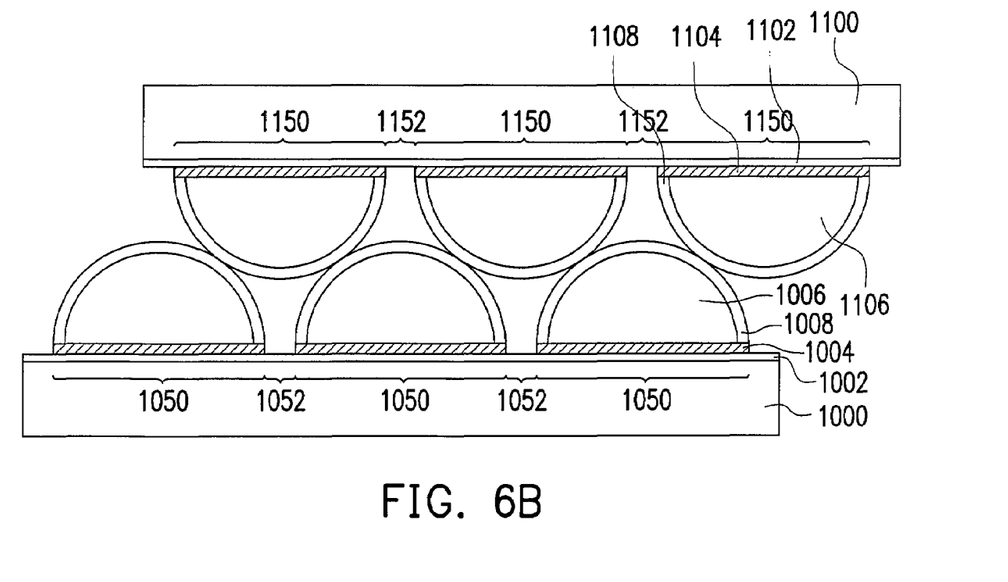
FIG. 6B is a cross-sectional view showing a flexible electro-optic film having a dual-electro-optic media structure according to the other embodiment of the present invention.

FIG. 6A is a cross-sectional view showing a flexible electro-optic film having a dual-electro-optic media structure according to another embodiment of the present invention. FIG. 6B is a cross-sectional view showing a flexible electro-optic film having a dual-electro-optic media structure according to the other embodiment of the present invention. As shown in FIG. 6A together with FIG. 6B, a first substrate 1000 and a second substrate 1100 have locating structures 1004 and 1104 formed thereon respectively. Each of the locating structures 1004 and 1104 comprises target regions 1050/1150 and peripheral regions 1052/1152 and electro-optical droplets 1006 and 1106 are formed in the target regions 1050 and 1150 respectively. The first substrate 1000 coated with a polymer layer is laminated with the second substrate 1100 coated with a polymer layer. The electro-optic droplets 1006 on the material layers 1004a of the target regions 1050 and the electro-optic droplets 1106 on the material layers 1104a of the target regions 1150 are covered by the capsule walls 1008 and 1108 respectively and the electro-optic droplets 1006 and the electro-optic droplets 1106 are separated from each other. Therefore, as mentioned above, the electro-optic droplets 1006 and 1106 can be made of different electro-optic media material or can have different colors. That is, by using different electro-optic media to form the electro-optic droplets 1006 and 1106 or to form the electro-optic droplets 1006 and 1106 with different colors, the customized color can be obtained and the brightness of the flexible electro-optic film is increased. Furthermore, the materials of the electro-optic droplets and the locating structure are as same as those mentioned in the previous embodiments and are not described herein. Also, the methods for forming the electro-optic droplets and for forming the locating structure are as same as what described above and are not described herein.

In the previous embodiments (FIGS. 4A through 4B, FIG. 5, FIGS. 6A through 6B), the design of the locating structure is based on the locating structure shown in FIGS. 1A through 1G. Nevertheless, the structure of the locating structure of the present invention is not limited to the aforementioned structure description. That is, the locating structures of the embodiments shown in FIGS. 2A through 2C and in FIGS. 3A through 3B can be applied to the locating structure for the dual-electro-optic media structure. Moreover, as for the displays shown in FIGS. 4A, 4B, 6A and 6B respectively, the electro-optic droplets on two substrates can be aligned to each other (as shown in FIGS. 4A and 6A) or can be staggeredly arranged (as shown in FIGS. 4B and 6B).

In the multi-layered electro-optic media structure mentioned above, since the material layer with the surface alignment purpose is formed on the substrate and the material layer is directly in contact with the electro-optic droplets, the crystal-type electro-optic media can be successfully aligned. Also, by using the capsule wall to separate different electro-optic media from each other, the individual electro-optic medium can be made of different material or display different color. For example, the electro-optic droplets in different structure layers can be made of cholesteric liquid crystals which can reflect lights with different wavelength, guest-host liquid crystal added with different dyes or the electrophoretic media with different colors. According to the practical needs, the multi-layered electro-optic media structure can be designed to display the customized color. Alternatively, one electro-optic media layer of the multi-layered electro-optic media structure can be made of levo-cholesteric liquid crystal and the other electro-optic media layer of the multi-layered electro-optic media structure can be made of dex-cholestoric liquid crystal so that the brightness of the dual-electro-optic media structure can be increased. Furthermore, the electro-optic media can be the potential driven electro-optic media or the current driven electro-optic media.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for forming a flexible electro-optic film, comprising:
    forming a first conductive layer on a first substrate;
    forming a first locating structure over the first conductive layer, wherein the first locating structure comprises a plurality of first target regions and a plurality of first peripheral regions around the first target regions and a surface tension of the first target regions is different from that of the peripheral regions;
    performing an electro-optic medium placing process for forming a first electro-optic droplet on each of the first target regions;
    performing a solidifying process on the surface of each of the electro-optic droplets for forming a first capsule wall only covering the surface of each of the first electro-optic droplets, and the surface of each of the electro-optic droplets is convex;
    providing a second substrate having a second conductive layer formed thereon; and
    laminating the first substrate with the second substrate.

2. The method of claim 1, wherein the second substrate further has a second locating structure disposed on the second conductive layer, and the second locating structure comprises a plurality of second target regions and a plurality of second peripheral regions around the second target regions, and the second substrate is laminated with the first substrate with the second target regions align to the first capsule wall.

3. The method of claim 1, wherein the step of forming the first locating structure comprises:
    forming a first material layer on the first conductive layer, wherein the first material layer is disposed in the first target regions respectively and a plurality of first spaces between the first material layer expose the first conductive layer in the first peripheral regions.

4. The method of claim 3, wherein the second conductive layer of the second substrate further comprises a second locating structure formed thereon and the second locating structure comprises a plurality of second target regions and a plurality of second peripheral regions around the second target regions, and the method for forming the second locating structure comprises steps of:
    forming a plurality of second material layers on the second conductive layer, wherein the second material layers are disposed in the second target regions respectively and a plurality of second spaces between the second material layers expose the second conductive layer in the second peripheral regions.

5. The method of claim 1, wherein the method for forming the first locating structure comprises:
    forming a first material layer on the first conductive layer in both of the first target regions and the first peripheral regions; and
    forming a first interval pattern layer on the first material layer in the first peripheral regions respectively to expose a portion of the first material layer of the first target regions, wherein a surface tension of the first interval pattern layer is different from that of the first material layer.

6. The method of claim 5, wherein the second substrate further comprises a second locating structure on the second conductive layer, and the second locating structure comprises a plurality of second target regions and a plurality of second peripheral regions around the second target regions and the method for forming the second locating structure comprises:
    forming a second material layer on the second conductive layer in the second target regions and the second peripheral regions; and
    forming a second interval pattern layer on the second material layer of the second peripheral regions, wherein a surface tension of the second interval pattern layer is different from that of the second material layer.

7. The method of claim 1, wherein the method for forming the first locating structure comprises:
    forming a first interval pattern layer on the first conductive layer in each of the peripheral regions to expose the first conductive layer in the first target regions.

8. The method of claim 1, wherein the step of forming the first locating structure comprises:
    forming a wall pattern layer on the first conductive layer in each of the first peripheral regions to expose the first conductive layer in the first target regions; and
    forming a first material layer on the first conductive layer and the wall pattern layer.

9. The method of claim 1, wherein the electro-optic medium placing process includes inject printing.

10. The method of claim 1, wherein the second substrate further comprises a second locating structure on the second conductive layer and the second locating structure comprises a plurality of second target regions and a plurality of second peripheral regions around the second target regions and each second target region has a second electro-optic droplet thereon.

11. The method of claim 10, wherein, in the step of laminating the first substrate with the second substrate, the first electro-optic droplets over the first substrate mutual merge with the second electro-optic droplets over the second substrate respectively.

12. The method of claim 10, wherein, in the step of laminating the first substrate with the second substrate, the first electro-optic droplets over the first substrate are separated from the second electro-optic droplets over the second substrate.

13. The method of claim 12, wherein the material of the first electro-optic droplets is different from that of the second electro-optic droplets.

14. The method of claim 12, wherein the color of the first electro-optic droplets is different from that of the second electro-optic droplets.

15. The method of claims 1 or 10, wherein the materials of the first electro-optic droplet and the second electro-optic droplets are selected from a group consisting of liquid crystal, electrowetting fluid, electrophoretic fluid, electrochromic fluid, choloesteric liquid crystal and guest-host liquid crystal.

16. The method of claim 1, wherein each of the first target regions of the first locating structure has a surface alignment purpose.

17. The method of claim 2, wherein each of the second target regions of the second locating structure has a surface alignment purpose.

18. The method of claim 1, wherein at least one of the first electro-optic droplet has the color or is made of the material different from those of the other first electro-optic droplets.

19. The method of claim 1, wherein the provided second substrate further comprises a second electro-optic media layer on the second conductive layer and, after the first substrate is laminated with the second substrate, the first electro-optic droplets are in contact with the second electro-optic media layer through the first capsule wall.

20. The method of claim 19, wherein the material of the first electro-droplets is selected from a group consisting of liquid crystal, electrowetting fluid, electrophoretic fluid, electrochromic fluid, choloesteric liquid crystal and guest-host liquid crystal.

21. The method of claim 19, wherein the material of the first electro-optic droplets is different from that of the second electro-optic media layer.

22. The method of claim 19, wherein the color of the first electro-optic droplets is different from that of the second electro-optic media layer.

23. The method of claim 19, wherein the method for forming the first locating structure comprises:

forming a plurality of first material layers over the first substrate, wherein the first material layers are disposed in the target regions respectively, and a plurality of spaces between the first material layers expose the first conductive layer in the first peripheral regions respectively.

24. The method of claim 23, wherein the first material layer has a surface alignment purpose.

25. The method of claim 19, wherein it further comprises a material layer disposed between the second substrate and the second electro-optic media layer.

26. The method of claim 25, wherein the material layer has a surface alignment purpose.

* * * * *